US010051077B2

(12) United States Patent
Li

(10) Patent No.: US 10,051,077 B2
(45) Date of Patent: *Aug. 14, 2018

(54) MOBILE CACHE FOR DYNAMICALLY COMPOSING USER-SPECIFIC INFORMATION

(71) Applicant: TAMIRAS PER PTE. LTD., LLC, Dover, DE (US)

(72) Inventor: Benjamin Bin Li, Concord, MA (US)

(73) Assignee: TAMIRAS PER PTE. LTD., LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/486,546

(22) Filed: Apr. 13, 2017

(65) Prior Publication Data
US 2017/0223129 A1 Aug. 3, 2017

Related U.S. Application Data

(63) Continuation of application No. 11/133,755, filed on May 19, 2005, now Pat. No. 9,648,122, which is a
(Continued)

(51) Int. Cl.
*H04L 29/08* (2006.01)
*H04L 12/26* (2006.01)

(52) U.S. Cl.
CPC .......... *H04L 67/2823* (2013.01); *H04L 43/16* (2013.01); *H04L 67/04* (2013.01); *H04L 67/2857* (2013.01); *H04L 67/306* (2013.01)

(58) Field of Classification Search
CPC . H04L 67/2823; H04L 67/2842; H04L 67/04; H04L 67/306; H04L 67/26; H04M 1/72525; H04M 1/7253; H04N 1/00344; H04N 1/00973; H04N 2201/0039; H04N 2201/006; H04N 2201/0017; H04N 2201/0075; H04N 2201/3205
See application file for complete search history.

(56) References Cited

U.S. PATENT DOCUMENTS 5,978,828 A * 11/1999 Greer ................ G06F 17/30884
707/999.01
6,061,678 A 5/2000 Klein et al.
(Continued)

OTHER PUBLICATIONS

Final Rejection on U.S. Appl. No. 09/684,047, dated Jan. 5, 2004.
(Continued)

*Primary Examiner* — Abdullahi E Salad

(57) ABSTRACT

A system and method for caching data in wireless application protocol (WAP) enabled services caches static data and facilitates dynamic creation of user-specific information to provide a customized output. The mobile cache generates the user-specific information in WML in real-time from cached information according to user-specified preferences. A change trigger triggers information delivery after a predetermined amount of cached information changes. The system may also include an image converter to ensure that image objects can be viewed easily on WAP-enabled devices having small display screens and a document converter to dynamically compose information from selected data based on XML-based content tagging.

20 Claims, 1 Drawing Sheet

Related U.S. Application Data continuation of application No. 09/684,047, filed on Oct. 6, 2000, now Pat. No. 6,901,437.

(56) References Cited

U.S. PATENT DOCUMENTS

| | | |
|---|---|---|
| 6,173,331 B1 | 1/2001 | Shimonishi |
| 6,219,676 B1 | 4/2001 | Reiner |
| 6,298,356 B1 | 10/2001 | Jawahar et al. |
| 6,345,279 B1 * | 2/2002 | Li .................. G06F 17/30905 |
| 6,421,733 B1 | 7/2002 | Tso et al. |
| 6,442,549 B1 | 8/2002 | Schneider |
| 6,473,609 B1 | 10/2002 | Schwartz et al. |
| 6,526,580 B2 | 2/2003 | Shimomura et al. |
| 6,549,898 B1 | 4/2003 | Inaba et al. |
| 6,564,251 B2 | 5/2003 | Katariya et al. |
| 6,854,120 B1 * | 2/2005 | Lo ....................... G06Q 10/06 |
| | | 719/311 |
| 2001/0020242 A1 | 9/2001 | Gupta et al. |
| 2001/0051927 A1 | 12/2001 | London et al. |
| 2001/0054087 A1 * | 12/2001 | Flom .................. G06F 17/3089 |
| | | 709/218 |
| 2002/0052824 A1 * | 5/2002 | Mahanti ................ G06Q 30/06 |
| | | 705/37 |
| 2002/0054090 A1 | 5/2002 | Silva et al. |
| 2002/0112014 A1 | 8/2002 | Bennett et al. |

OTHER PUBLICATIONS

Final Rejection on U.S. Appl. No. 11/133,755, dated Dec. 4, 2008.
Non-Final Office Action on U.S. Appl. No. 09/684047, dated Jul. 14, 2003.
Non-Final Office Action on U.S. Appl. No. 11/133,755, dated Dec. 14, 2007.
Non-Final Office Actionon U.S. Appl. No. 09/684,047, dated Jun. 18, 2004.
Notice of Allowance on U.S. Appl. No. 09/684,047, dated Jan. 26, 2005.
Office Action on U.S. Application dated Jun. 4, 2013 U.S. Appl. No. 11/133,755.

* cited by examiner

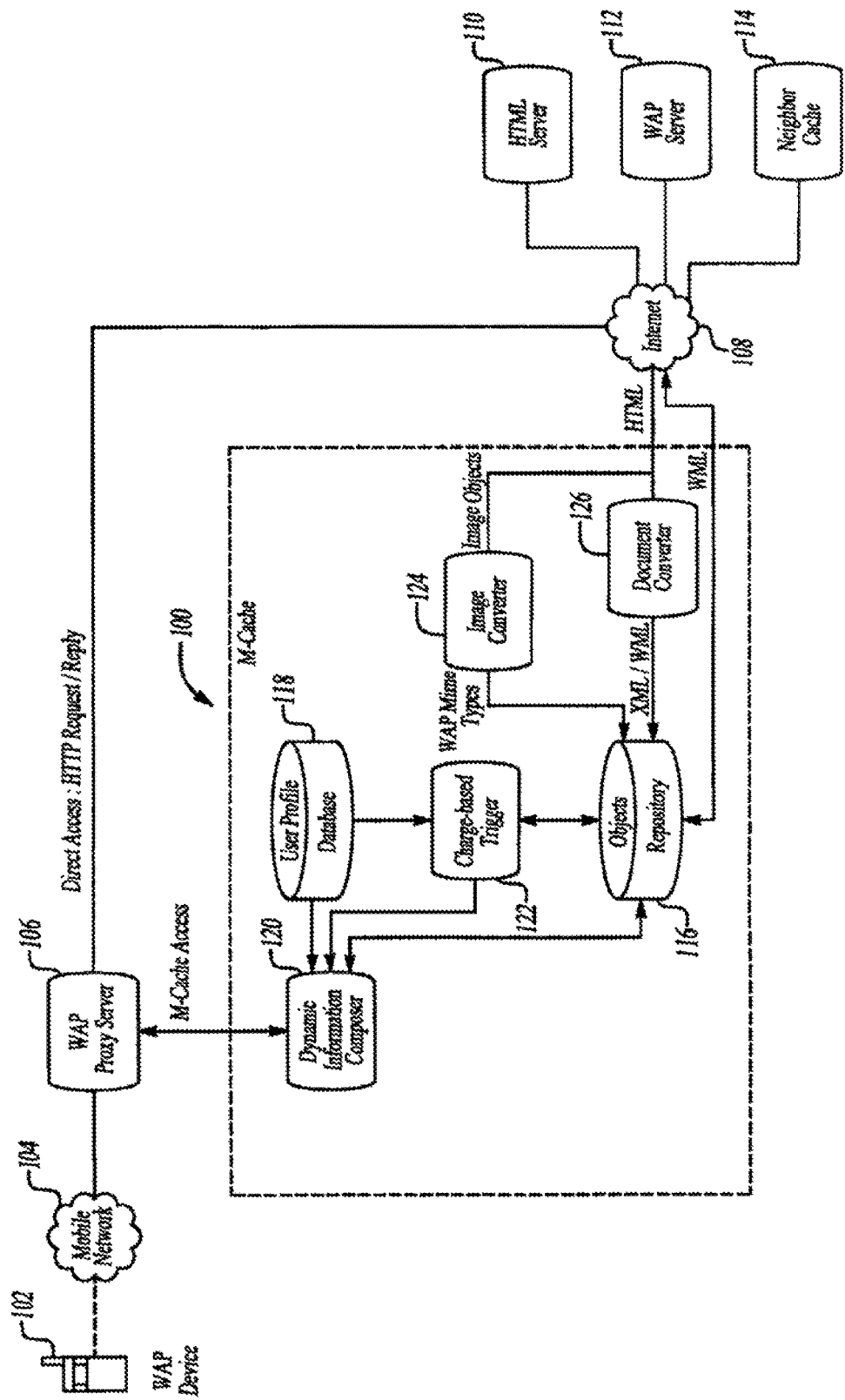

MOBILE CACHE FOR DYNAMICALLY COMPOSING USER-SPECIFIC INFORMATION

CROSS-REFERENCE TO RELATED PATENT APPLICATIONS

This application is a continuation of U.S. application Ser. No. 11/133,755, filed May 19, 2005, which is a continuation of U.S. application Ser. No. 09/684,047, filed Oct. 6, 2000, now U.S. Pat. No. 6,901,437, incorporated herein by reference in their entireties.

TECHNICAL FIELD

The present invention relates to caching, and more particularly to a cache that handles both static and dynamic data.

BACKGROUND OF THE INVENTION

Wireless Application Protocol ("WAP") enabled services are currently becoming more popular as more users incorporate wireless devices into their daily lives. As is known in the art, WAP is a standardized way for wireless devices (e.g. portable phones, hand-held devices) to communicate with each other and to access the Internet.

Caches are widely used in many applications to improve processing speed by providing a location for temporary data storage. For example, the cache can store recently accessed Web pages so that, when the user later returns to the Web page, the browser obtains the Web page information locally from the cache rather than from the origin server. The information from the cache reaches the user faster and also relieves the network from the burden of the additional traffic that would have occurred if the Web page information had to be re-transmitted to the wireless device.

Currently known-caching schemes in wireless applications, however, can deal only with static data and cannot generate any information according to user-specified parameters. As a result, there are no known ways of providing personalized information delivery with existing cache systems.

There is a need for a cache system that is not limited to handling static data and that can handle and generate dynamic user-specific information.

SUMMARY OF THE INVENTION

Accordingly, the present invention is directed to a mobile cache system and method for Wireless Application Protocol ("WAP") enabled services. The inventive mobile cache system not only can cache static data, but also can share processing functions with origin Web servers and facilitate dynamic creation of user-specific information.

A mobile cache server according to the invention obtains a user profile, which contains preference data with respect to output content and layout, looks for user-requested information in an object database, fetches and caches the information from an origin server if the information is not already in the object database, and composes user-specific information according to the preference data.

As a result, the inventive system and method caches static data like known caches but also shares data processing functions with origin Web servers and allows dynamic creation of user-customized information. By dynamically generating information as well as caching static pages, the invention reduces traffic burden on the original server while providing users with personalized, user-specified information service.

BRIEF DESCRIPTION OF THE DRAWING

FIG. 1 is a schematic diagram of a mobile cache system architecture incorporating one embodiment of the present invention.

DETAILED DESCRIPTION OF THE PREFERRED EMBODIMENT

FIG. 1 is a representative diagram of a mobile cache system architecture incorporating the mobile cache of the present invention. As indicated in the Figure, the mobile cache 100 is particularly suited to a system using Wireless Application Protocol ("WAP") enabled services and is designed to improve the experience of wireless device (e.g. wireless phones, hand-held devices) users during Internet access. As can be seen in the Figure, a wireless device 102 couples to the mobile cache 100 via a mobile network 104 connected to a WAP proxy server 106. The WAP proxy server 106 is connected to the mobile cache 100 and directly to the Internet 108, which include Hypertext Markup Language ("HTML") servers 110, WAP servers 112, and/or neighbor caches 114. The term "origin server" will be used in this application to refer to any location from which the mobile cache 100 obtains its original data, such as the Internet 108.

The mobile cache 100 itself preferably includes an object repository or database 116 that caches selected data from the origin server, such as recently accessed Web pages. The mobile cache 100 also includes a user profile database 118 and a dynamic information composer 120. The user profile database 118 stores one or more user profiles that contain output preference data. The output preference data may include data specifying the content and layout of the information fetched from the object database 116 when it is delivered to the user via the wireless device 102. When the mobile cache 100 receives a user request for specific information from the Internet 108, it first looks to the user profile database 118 to obtain the user profile associated with the user making the request. If the user's profile is not available in the database 118, the mobile cache 110 may either display the fetched information using standardized content and formatting or request additional information from the user to generate a new user profile to be stored in the user profile database 118.

Once the mobile cache 100 receives a user request and obtains the user profile from the user profile database 118, the mobile cache server looks for the requested information in the object database 116. If all of the requested information is located in the object database 116, the dynamic information composer 120 uses the requested information to compose user-specific information according to the user's preferences with respect to content and layout. The information is preferably composed in Wireless Markup Language ("WML") in real time. The user-specific information is then outputted-to the wireless device 102 for the user's consideration.

If the object database does not contain all of the requested information and if the missing information is not available in local or neighbor caches, the mobile cache 100 will declare a cache miss and pass the user request to the origin server so that the information can be fetched from the origin server (e.g., the Internet 108) and then stored in the object database 116. The dynamic information composer 120 then composes the user-specific information in the manner explained above, according to the user's preferences with respect to content and layout specified in the user profile. As the dynamic information composer 120 generates the user-specific information and caches static pages, the mobile cache 100 may locally maintain logs that can be appended to log files of origin servers.

As can be seen in FIG. 1, the mobile cache 100 may also include a change-based trigger 122 that monitors information changes in the object database 116 and triggers information delivery, according to user preferences, when the amount of changed information reaches a predetermined threshold. This monitoring and triggering preferably occurs even while the dynamic information composer 120 is composing user-specific information.

The mobile cache 100 according to the present invention also may include an image converter 124 and/or a document converter 126. The image converter 124 can be used alone if the mobile cache 100 is constructed to function in its simplest mode. Caching image objects improves performance by saving a great deal of network bandwidth. Because the small screens in wireless devices, such as phones and hand-held devices, have difficulty rendering the image objects that are often attached to HTML files, the image converter 124 converts the image objects so that they can be viewed by WAP-enabled devices before they are cached into the object database 116.

The document converter 126 can be included to create an advanced operating mode for the mobile cache 100 by being able to extract data segments from single or multiple Web pages to provide further dynamic information composition capability. The document converter 126 takes advantage of XML-based content tagging by converting the HTML files obtained from the origin server into Extensible Markup Language ("XML") files and storing them in the object database. The XML files, including their content-based tags, can then be queried by the mobile cache-server based on the user's information request so that selected data segments from the XML files can be used to dynamically compose the user-specific information. By taking advantage of the XML-based content tags, the mobile cache 100 can customize the user-specific data at an additional level of detail. Of course, if the data from the origin server is already a WML file, the WML file can be transmitted directly for storage in the object database 116 without first passing through the image converter 124 or the document converter 126.

Thus, the inventive mobile cache system is particularly suited for wireless application protocol (WAP) services and can be incorporated for use with WAP proxy or Web servers. Caching satisfies user information requests without having to access the origin server, reducing network bandwidth and reducing traffic load on origin servers. Further, by combining caching with dynamic information composition/transformation and providing the option of converting existing HTML applications for use on WAP-enabled services, the inventive mobile cache system can provide personalized WAP service and improved network and server performance at the same time.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A method comprising:
   receiving a request at a mobile cache from a wireless device via a wireless network for requested information from an object database at the mobile cache;
   requesting, at the mobile cache, the requested information from an origin server if the object database does not contain the requested information;
   dynamically composing, at the mobile cache, user-specific information and output based on the requested information for transmission to the wireless device;
   monitoring, at the mobile cache, a number of information changes in the object database; and
   triggering delivery of the user-specific information once the number of information changes in the object database at the mobile cache reaches a predetermined threshold.

2. The method of claim 1, wherein the mobile cache includes a user profile having output preference data with output content and output layout information.

3. The method of claim 1, further comprising obtaining the user-specific information from the origin server if not all requested information is present in the object database.

4. The method of claim 1, further comprising storing selected data from the origin server in the object database at the mobile cache and converting an image format of the selected data from the origin server.

5. The method of claim 4, wherein the caching occurs after the image format converting.

6. The method of claim 3, further comprising converting a document format of the selected data from the origin server.

7. The method of claim 3, further comprising extracting at least one data segment of the selected data based on output preference data such that the dynamically composing composes the user-specific information from the at least one data segment.

8. A system comprising:
   a wireless device;
   a wireless network; and
   a mobile cache that is separate from the wireless device by the wireless network, wherein the mobile cache includes a dynamic information composer that dynamically composes user-specific information and output based on requested information stored in an object database for transmission to the wireless device, wherein the mobile cache includes a change trigger that monitors a number of information changes in the object database and that triggers delivery of the user-specific information once the number of information changes in the object database at the mobile cache reaches a predetermined threshold.

9. The system of claim 8, wherein the mobile cache includes a user profile having output preference data with output content and output layout information.

10. The system of claim 8, wherein the mobile cache includes an object database that stores selected data from the origin server in an object database at the mobile cache.

11. The system of claim 10, wherein the mobile cache includes an image converter that converts an image format of the selected data from the origin server.

12. The system of claim 11, wherein the image is stored in the object database after the image format converting.

13. The system of claim 10, wherein the mobile cache includes a document converter that converts a document format of the selected data from the origin server.

14. The system of claim 13, wherein the document converter extracts at least one data segment of the selected data based on output preference data such that the dynamically composer composes the user-specific information from the at least one data segment.

15. A non-transitory computer readable medium having instructions stored thereon for execution by a processor, the instructions comprising:
- instructions to receive a request at a mobile cache from a wireless device via a wireless network for requested information from an object database at the mobile cache;
- instructions to request, at the mobile cache, the requested information from an origin server if the object database does not contain the requested information;
- instructions to dynamically compose, at the mobile cache, user-specific information and output based on the requested information for transmission to the wireless device;
- instructions to monitor, at the mobile cache, a number of information changes in the object database; and
- instructions to trigger delivery of the user-specific information once the number of information changes in the object database at the mobile cache reaches a predetermined threshold.

16. The non-transitory computer readable medium of claim 15, wherein the mobile cache includes a user profile having output preference data with output content and output layout information.

17. The non-transitory computer readable medium of claim 15, further comprising instructions to store selected data from the origin server in the object database at the mobile cache.

18. The non-transitory computer readable medium of claim 17, further comprising instructions to convert an image format of the selected data from the origin server.

19. The non-transitory computer readable medium of claim 18, wherein the caching occurs after the image format converting.

20. The non-transitory computer readable medium of claim 17, further comprising instructions to convert a document format of the selected data from the origin server.

* * * * *